United States Patent
Ganguly et al.

(10) Patent No.: US 11,782,763 B2
(45) Date of Patent: Oct. 10, 2023

(54) RESOLUTION OF TICKETS IN A MULTI-TENANT ENVIRONMENT

(71) Applicant: Oracle International Corporation, Redwood Shores, CA (US)

(72) Inventors: Shubhojyoti Ganguly, Howrah (IN); Dipangshu Mukherjee, Hyderabad (IN); Koushik Chakraborty, Kolkata (IN); Raghunandan Bhat, Mangalore (IN); Sampath Kumar Sunkesala, Bangalore (IN); Pranay Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 218 days.

(21) Appl. No.: 16/404,798

(22) Filed: May 7, 2019

(65) Prior Publication Data

US 2020/0356412 A1 Nov. 12, 2020

(51) Int. Cl.
*G06F 9/50* (2006.01)

(52) U.S. Cl.
CPC .................. *G06F 9/5027* (2013.01)

(58) Field of Classification Search
CPC ...... G06F 9/5027; G06F 9/5077; G06N 20/00
See application file for complete search history.

(56) References Cited

U.S. PATENT DOCUMENTS

| | | | |
|---|---|---|---|
| 8,291,319 B2 * | 10/2012 | Li | G06F 16/951 707/999.005 |
| 9,229,800 B2 | 1/2016 | Jain et al. | |
| 9,542,259 B1 | 1/2017 | McEwen et al. | |
| 9,667,473 B2 * | 5/2017 | Anerousis | H04L 41/0686 |
| 9,959,161 B2 | 5/2018 | Claypool, III et al. | |
| 10,079,736 B2 | 9/2018 | Bellini, III et al. | |
| 2006/0080666 A1 * | 4/2006 | Benedetti | G06F 9/5038 718/104 |

(Continued)

OTHER PUBLICATIONS

Wubai Zhou, et al., STAR: A System for Ticket Analysis and Resolution, Conference: In Proceeding of 23rd ACM SIGKDD Conference on Knowledge Discovery and Data Mining, Aug. 2017, 11 Pages.

(Continued)

*Primary Examiner* — Jorge A Chu Joy-Davila
(74) *Attorney, Agent, or Firm* — IPHORIZONS PLLC; Narendra Reddy Thappeta

(57) ABSTRACT

An aspect of the present disclosure facilitates resolving tickets in a multi-tenant environment. In one embodiment, a server receives a ticket for a tenant from a ticketing system and then determines a gross job representing a class of jobs suitable for resolution of the received ticket. The server then identifies a set of values for a set of system parameters characterizing the computing resources serving the tenant. The server selects a target job based on the combination of the determined gross job and the set of values for the set of system parameters. The selected target job is then executed to cause resolution of the ticket for the tenant. According to another aspect, the server performs the above noted actions automatically without manual intervention, in response to adding of the ticket into the ticketing system.

20 Claims, 16 Drawing Sheets

(56) References Cited

U.S. PATENT DOCUMENTS

| | | | |
|---|---|---|---|
| 2013/0113616 A1* | 5/2013 | Pinel | G06Q 10/0631 340/501 |
| 2013/0204650 A1* | 8/2013 | Sabharwal | G06Q 30/016 705/7.13 |
| 2014/0351416 A1* | 11/2014 | Santos Andrade | H04L 41/5074 709/224 |
| 2017/0019315 A1 | 1/2017 | Tapia et al. | |
| 2017/0262621 A1* | 9/2017 | Venkataraman | G06F 21/335 |
| 2017/0270419 A1 | 9/2017 | Sanchez Charles et al. | |
| 2018/0260760 A1 | 9/2018 | Srivastava et al. | |
| 2018/0307756 A1* | 10/2018 | Garay | G06N 20/00 |
| 2018/0308031 A1* | 10/2018 | Yan | G06Q 10/06 |
| 2019/0325323 A1* | 10/2019 | Walthers | G06N 7/005 |
| 2020/0012728 A1* | 1/2020 | Jan | G06N 20/00 |
| 2020/0044911 A1* | 2/2020 | Kliger | H04L 41/0654 |

OTHER PUBLICATIONS

Qihong Shao, Yi Chen, et al., A Ticket Routing Recommendation Engine for Enterprise Problem Resolutio, Aug. 2008, 04 pages.
AnswerIQ™ AI for customer support, www.answeriq.com/automated-response, downloaded circa Dec. 13, 2018, 02 pages.
Automated Customer Support Triage, www.answeriq.com/automated-triage, downloaded circa Dec. 13, 2018, 02 pages.
Improving the Future by Learning from the Past, www.answeriq.com/howitworks, downloaded circa Dec. 13, 2018, 02 pages.

\* cited by examiner

| Atom Job Run | RFC | SID | Atom Job | ... | Product | Title | Description |
|---|---|---|---|---|---|---|---|
| 2018Mar000012331 | 3-7W1FCCR | PTHY4I | EBS122 - Apps Patching | ... | EBSO | PTHY4I - CPU EBSO JAN18-CPU patches | PTHY4I - CPU EBSO JAN18-CPU patches |
| 2018Mar000012248 | 3-7SS7ORH | DFCMPI | DB PSU_EBS Apps Patch -wo DR | ... | EBSO | JAN18CPU: Apply Jan CPU | Based on the Production RFC # 3-7P4YAB2, creating the non-prod RFC for applying JAN'18 CPU patches in the instance DFCMPI. |
| 2018Mar000012243 | 3-7VYVIPF | TRXE1S | Database PSU -Non-EBS -wo DR | ... | OTO_IDM | JAN18CPU: Jan-18 CPU/PSU patching | Please prepare a plan for Jan-18 CPU/PSU Patching for IDM preprod TRXE1S instance |
| 2018Mar000012220 | 3-7U5GVIT | DCOO13 | Database PSU -Non-EBS -wo DR | ... | OBIEE | Please prepare action plan to apply latest Oracle Database PSU 12.1.0.2.180116 | Please prepare action plan to apply latest Oracle Database PSU 12.1.0.2.180116 |
| 2018Mar000012174 | 3-7V6PWAF | DWBR17 | Database PSU -Non-EBS -wo DR | ... | Hyperion | DWBR17: Apply JAN 2018 database PSU patches | Please Apply JAN 2018 database PSU patches SID: DWBR17 |
| 2018Mar000012150 | 3-7QNPIC5 | TMNAVI | HC-DOWN-BKP-PAUSE-START-HC | ... | EBSO | REORG database for ALL schemas on instance TMNAVI | Team, 1. Please proceed to execute REORG database for ALL schemas on instance TMNAVI 2. Drop and recreate TEMP tablespace with minimal size Thank you. |
| 2018Mar000012120 | 3-7VKVB33 | UMSAN3 | Database PSU -Non-EBS -wo DR | ... | OBIEE | JAN18CPU: UMSAN3: Jan2018 CPU/PSU for DB Tier | env: UMSAN3 1) Please prepare plan to apply Jan2018 CPU patches. 2) Patch 23573832 from 3-1603960290I |
| 2018Mar000012119 | 3-7VPQPAR | TMSA1O | Database PSU -Non-EBS -wo DR | ... | OTO | JAN18CPU: TMSA1O: Jan2018 CPU/PSU for DB | TMSA1O: Jan2018 CPU/PSU for DB 1) Please prepare plan to apply Jan2018 CPU/PSU patches on DB |
| 2018Mar000012115 | 3-7UEICZL | TWRL9I | DBPSU EBS122_Apps Patch - wo DR | ... | EBSO | JAN18CPU Apply Jan-2018 DB CPUs and Framework patch 19 | Apply Jan-2018 DB CPUs and Framework patch 19 |

*FIG. 4A*

440

Top 10 keywords for job = 1099 Patching
[('patch', 1.7175574689170392), ('pmp', 0.3784448660325568), ('latest', 0.23288914832773416), ('ebs', 0.23288914832773416), ('ap', 0.20377800478676739), ('prod', 0.17466686124558006), ('plan', 0.17466686124558006), ('year', 0.14555571770483386), ('tax', 0.14555571770483386), ('available', 0.14555571770483386), ('inc', 0.11644457416386708), ('convergent', 0.11644457416386708), ('changes', 0.11644457416386708), ('pre', 0.08733343306229003), ('end', 0.08733343306229003)]

no: 1
Top 10 keywords for job = Database PSU -Non-EBS -with DR
[('patch', 1.4578059518342095), ('pmp', 0.3106799569482416), ('cpu', 0.21508612404111129), ('plan', 0.1911876658143226), ('latest', 0.1911876658143226), ('ebs', 0.1911876658143226), ('prod', 0.16728920758753224), ('db', 0.16728920758753224), ('ap', 0.16728920758753224), ('year', 0.11949229113395161), ('tax', 0.11949229113395161), ('available', 0.11949229113395161), ('psu', 0.09559383829071613), ('pre', 0.09559383829071613), ('oct', 0.09559383829071613)]

no: 2
Top 10 keywords for job = Database PSU -Non-EBS -wo DR
[('cpu', 0.9361518198070751), ('patch', 0.7012868756615194), ('db', 0.5259651567113955), ('psu', 0.5061174149487013), ('jan', 0.3936468782934337), ('oct', 0.2613285998754324), ('january', 0.23817290115233003), ('october', 0.19186150370604366), ('prod', 0.18524558978514558), ('team', 0.14224214929993082), ('plan', 0.13893341923388591), ('mt', 0.11908645057616501), ('arcadis', 0.09262279489257279), ('pmp', 0.08931483793212376), ('critical', 0.08931483793212376)]

no: 3
Top 10 keywords for job = Database Upgrade - Non-EBS
[('cpu', 0.9265881462198822), ('patch', 0.6949411096649116), ('db', 0.5501617118180551), ('psu', 0.4922499526793124), ('jan', 0.3828610743061319), ('oct', 0.2573855961721895), ('january', 0.23486435650712292), ('october', 0.18660455722483744), ('prod', 0.18338723727268502), ('plan', 0.14156207789470424), ('team', 0.13834475794255185), ('mt', 0.11904083822963765), ('latest', 0.0965195958645710), ('critical', 0.09651959585645710), ('pmp', 0.09008495866026632)]

no: 4
Top 10 keywords for job = DB PSU_EBS Apps Patch -with DR
[('cpu', 0.9005614480318), ('patch', 0.6383391445928424), ('db', 0.4529294345451287), ('psu', 0.4158474925355860), ('jan', 0.3787655505260434), ('prod', 0.2569248839232602), ('january', 0.2251403622007955), ('oct', 0.2171942317701787), ('october', 0.1589226086123258), ('plan', 0.1483277680381708), ('non', 0.1297867970333946), ('team', 0.1191919564592442), ('latest', 0.1059484057415506), ('critical', 0.1059484057415506), ('mt', 0.0980022753109342)]

*FIG. 4B*

| RFC | Summary | Gross Job |
|---|---|---|
| 3-7W1FCCR | PTHY4I - CPU EBSO JAN18-CPU patches PTHY4I - CPU EBSO JAN18-CPU patches | EBS patching |
| 3-7SS7ORH | JAN18CPU: Apply Jan CPU Based on the Production RFC # 3-7P4YAB2 , creating | DB PSU |
| 3-7VYVIPF | JAN18CPU: Jan-18 CPU/PSU patching Please prepare a plan for Jan-18 CPU/PSU | DB PSU |
| 3-7U5GVIT | Please prepare action plan to apply latest Oracle Database PSU 12.1.0.2.180 | DB PSU |
| 3-7V6PWAF | DWBR17: Apply JAN 2018 database PSU patches Please Apply JAN 2018 database | DB PSU |
| 3-7V90YPZ | Enable TLS V1.2 for Punchouts Please enable TLS V1.2 for iProcurement Punch | EBS patching |
| 3-7VKVB33 | JAN18CPU: UMSAN3: Jan2018 CPU/PSU for DB Tier env: UMSAN31) Please prepar | DB PSU |
| 3-7VPQPAR | JAN18CPU: TMSA1O: Jan2018 CPU/PSU for DB TMSA1O: Jan2018 CPU/PSU for DB 1) | DB PSU |
| 3-7UEICZL | JAN18CPU Apply Jan-2018 DB CPUs and Framework patch 19 Apply Jan-2018 DB CP | DB PSU |
| 3-7U0VBQV | Corrective Action: R12.AD.B.delta.8 as pre-requisite to path 22644544:12.1. | EBS patching |

| SR_RFC | ID | TARGET | TARGET_TYPE | SUB_STATUS | SP | CUSTOMER_NAME | SUMMARY | LAST_UPD | LAST_UPD | OWNER | GROUP_NAME |
|---|---|---|---|---|---|---|---|---|---|---|---|
| RFC | 3-9055GDA | PFLBLO | INSTANCE | Assessed | 2-3 | Administradora De Servicious Y Sistemas Automatizados Falabella Ltda | JAN19CPU : Apply Jan CPU | 14-MAR-2019 05:10:43 | Mar-2019 | RMAKKENA | OHSRM |
| RFC | 3-8Z1920L | TMCP2O | INSTANCE | Awaiting customer UAT | 2-3 | Maricopa Country Community College District | JAN19CPU : Apply Jan CPU | 14-MAR-2019 05:10:43 | Mar-2019 | RMAKKENA | OHSRM |
| RFC | 3-9055GFP | PMCP2O | INSTANCE | Assessed | 2-3 | Maricopa Country Community College Distric | JAN19CPU : Apply Jan CPU | 11-MAR-2019 06:09:42 | Mar-2019 | RMAKKENA | OHSRM |
| RFC | 3-8Z0SBWH | TLEN3O | INSTANCE | Awaiting customer UAT | 2-3 | Lennar Corporation | JAN19CPU : Apply Jan CPU | 14-MAR-2019 04:35:35 | Mar-2019 | RMAKKENA | OHSRM |
| RFC | 3-9055GEW | PLEN3O | INSTANCE | Assessed | 2-3 | Lennar Corporation | JAN19CPU : Apply Jan CPU | 11-MAR-2019 19:08:34 | Mar-2019 | RMAKKENA | OHSRM |

*FIG. 5A*

```
550
DB_Release:
    argument_pattern:
        Pattern1: "((DB|RDBMS|Database) ( )?upgrade)|(upgrade( )?(DB|RDBMS|Database))"
    superset_pattern:
        Pattern1: "((DB|RDBMS|Database) ( )?upgrade( ) ?(oracle)?( )?(DB|RDBMS|Database))"
        Pattern2: "((upgrade( )? ( )?(DB|RDBMS|Database))( from (12c|11g|11.2.0.[3-4]))?( )?(12c|11g|11.2.0.4|12.1.0.2|12.1.0.2.0))"
        Pattern3: "((DB|RDBMS|Database) ( )?upgrade )?(oracle)?( )?(DB|RDBMS|Database))"
    exclude pattern :
        Pattern1: "(from (12c|11g|11.2.0.[3-4]))"
        Pattern2: "(from (12c|11g|11.2.0.[3-4]))"
        Pattern3: "(from (12c|11g|11.2.0.[3-4]))"
    version pattern :
        Pattern1: "11g|11.2.0.4|11204|12c|12.1.0.2.0|12.1.0.2|12102"
        Pattern2: "11g|11.2.0.4|11204|12c|12.1.0.2.0|12.1.0.2|12102"
        Pattern3: "11g|11.2.0.4|11204|12c|12.1.0.2.0|12.1.0.2|12102"
IOP:
    argument pattern:
        pattern1: "((DB|RDBMS|Database) ( )?upgrade ( )?(oracle)?( )?(DB|RDBMS|Database))"
        pattern2: ""
    superset pattern:
        Pattern1: "Interoperability patches"
    exclude pattern :
    Version pattern :
        Pattern1: "latest"
```

RFC : 3-86BH62U,
Detected Job : PSU ,
Prediction Confidence : 91.6388%,
Gross job : PSU, Arguments : {'CPU': {'latest'}, 'PSU': {'latest'}}

RFC : 3-863H6LK,
Detected Job : PSU ,
Prediction Confidence : 50.2232%,
Gross job : Not Predicted , Arguments : No Arguments Tested RFC : 3-881ONLL,
Detected Job : EBS patching ,
Prediction Confidence : 34.3407%,
Gross job : Not Predicted ,
Arguments : No Arguments Tested RFC : 3-8AEKW75,
Detected Job : PSU ,
Prediction Confidence : 99.9358%,
Gross job : PSU, Arguments : {'CPU': {'latest'}, 'PSU': {'latest'}}

RFC : 3-87QOM95,
Detected Job : PSU ,
Prediction Confidence : 87.2853%,
Gross job : PSU, Arguments : {}

RFC : 3-8ACPFQF,
Detected Job : EBS patching ,
Prediction Confidence : 99.7128%,
Gross job : EBS patching, Arguments : {'HRMS': {'latest'}, 'POSTPATCH': {'27115060'}}

*FIG. 5C* set of inputs:
-----------
instanceInfo = {"EBS": '1', "R122": '1', "RAC": '1', "DR": '1' }
grossArgs = {'CPU': {'2018', 'apr'}, 'PSU': {'2018', 'apr'}, 'JDK': {'latest'}, 'postpatch': {'1231324', '1234344'}}

*FIG. 6A*

| Gross Job: PSU | | | | | | | | | |
|---|---|---|---|---|---|---|---|---|---|
| EBS | DB_Version | R122 | DR | RAC | Linux | Exa | GRID | Refresh | Job Name |
| 0 | 1 | 0 | 0 | 0 | 1 | 0 | 0 | 1 | Database PSU-Non-EBS-wo DR |
| 0 | 1 | 0 | 1 | 0 | 1 | 0 | 0 | 1 | Database PSU-Non-EBS-with DR |
| 0 | 1 | 0 | 0 | 1 | 1 | 0 | 0 | 1 | RAC DB PSU -Non-EBS-wo DR |
| 0 | 1 | 0 | 1 | 1 | 1 | 0 | 0 | 1 | RAC DB PSU -Non-EBS-with DR |
| 1 | 1 | 0 | 0 | 0 | 1 | 0 | 0 | 1 | DB PSU_EBS Apps Patch -wo DR |
| 1 | 1 | 0 | 1 | 0 | 1 | 0 | 0 | 1 | DB PSU_EBS Apps Patch -with DR |
| 1 | 1 | 0 | 0 | 1 | 1 | 0 | 0 | 1 | RAC DB PSU_EBS AppsPatch -wo DR |
| 1 | 1 | 0 | 1 | 1 | 1 | 0 | 0 | 1 | RAC DB PSU_EBS AppsPatch -with DR |
| 1 | 1 | 1 | 0 | 0 | 1 | 0 | 0 | 1 | DB PSU EBS122_AppsPatch-with DR |
| 1 | 1 | 1 | 1 | 0 | 1 | 0 | 0 | 1 | DB PSU EBS122_AppsPatch-wo DR |
| 1 | 1 | 1 | 1 | 1 | 1 | 0 | 0 | 1 | RAC DB PSU EBS122AppPatch-with DR |
| 1 | 1 | 1 | 0 | 1 | 1 | 0 | 0 | 1 | RAC DB PSU EBS122AppPatch-wo DR |

Submitted Args:
PSU
{'CPU': {'october', '2018'}, 'PSU': {'october', '2018'}}
tqbe37

========= AutoOps Job and Arguments Detection ==========
Detected Job =
RAC DB PSU -Non-EBS -wo DR
─────────────────────────────────────────────
Detected Dynamic Args =
{
repository : deploy
metafile : ebso_cpu!psu_oct_2018,forms_psu!psu_oct_2018,oas_psu!psu_oct_2018
DBPSU_release : RACPSU#1018
metafile_disco : wls_psu_disco!psu_oct_2018,fmw_psu_disco!psu_oct_2018
LCA : nolca
fileedition :
autoconfig : include
excludepatch :
excludeopatch :
excludenode :
prepatch :
postpatch :
}
================= End of AutoOps =================

670 →

Submitted Args:
PSU
{'CPU': {'october', '2018', '18'}, 'PSU': {'october', '2018', '18'}}
dthuri ========= AutoOps Job and Arguments Detection =========
Detected Job =
DB PSU_EBS Apps Patch -wo DR
———————————————————————

Detected Dynamic Args =
{
repository : deploy
metafile : ebso_cpu|psu_oct_2018,forms_psu|psu_oct_2018,oas_psu|psu_oct_2018
DBPSU_release : DBPSU#1018
metafile_disco : wls_psu_disco|psu_oct_2018,fmw_psu_disco|psu_oct_2018
LCA : nolca
fileedition :
autoconfig : include
excludepatch :
excludeopatch :
excludenode :
prepatch :
postpatch :
}
============ End of AutoOps ==================

*FIG. 6D*

| Job Name | Available Job |
|---|---|
| Database PSU-Non-EBS-wo DR | Database PSU-Non-EBS-wo DR |
| Database PSU-Non-EBS-with DR | Database PSU-Non-EBS-with DR |
| RAC DB PSU -Non-EBS-wo DR | |
| RAC DB PSU -Non-EBS-with DR | RAC DB PSU -Non-EBS-with DR |
| ... | ... |
| RAC DB PSU EBS122AppPatch–with DR | RAC DB PSU EBS122AppPatch–with DR |
| RAC DB PSU EBS122AppPatch–wo DR | RAC DB PSU EBS122AppPatch–wo DR |

680

| Job Name | Available Job |
|---|---|
| Database PSU-Non-EBS-wo DR | Database Patch-Non-EBS-wo DR |
| Database PSU-Non-EBS-with DR | Database Patch-Non-EBS-with DR |
| RAC DB PSU -Non-EBS-wo DR | RAC DB Patch -Non-EBS-wo DR |
| RAC DB PSU -Non-EBS-with DR | RAC DB Patch -Non-EBS-with DR |
| ... | ... |
| RAC DB PSU EBS122AppPatch–with DR | RAC DB Patch EBS122AppPatch–with DR |
| RAC DB PSU EBS122AppPatch–wo DR | RAC DB Patch EBS122AppPatch–wo DR |

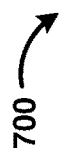

***********************************
ATOM 2.0 Schedule Detail
***********************************
Job Name:        DB_PSU_EBS Apps Patch -wo DR
Run UUID:        2018Feb00005226
Instance Name:   TBSBII
Scheduled Time:  2018-02-08 05:08:00 UTC
Tasks:

Database PSU - Planning - Arguments: tbsbii   DBPSU#0117
DB Standalone Heath Check - Arguments: -instance tbsbii -tier db -health
EBS MT Standalone Health Check - Arguments: -instance tbsbii -tier mt -health
EBS Apps Patching - Planning - Arguments: -script mco_ood_automation.sh -product EBSO
    -instance tbsbii -applymode verify -metafile ebso_cpu,forms_psu,oas_psu
    -options nolca,forcedeploy -autoconfig include
Discoverer Patching - Planning - Arguments: -script mco_ood_automation.sh -instance tbsbii
    -applymode verify -metafile noop -options forcedeploy -product DISCO
DB Pre Health Checks - Arguments: -instance tbsbii -tier db -pre
EBS MT Pre Health Checks - Arguments: -instance tbsbii -tier mt -pre
MT Special Instructions - Arguments: -instance tbsbii -si_script mt_pre_shutdown.sh
EBS Middle tier Shutdown - Arguments: -instance tbsbii -stop -tier mt
MT Special Instructions *1 - Arguments: -instance tbsbii -si_script mt_post_shutdown.sh
DB Special Instructions - Arguments: -instance tbsbii -si_script db_pre_shutdown.sh
DB tier Shutdown - Conditional - Arguments: -instance tbsbii -tier db -backup
DB Special Instructions *1 - Arguments: -instance tbsbii -si_script db_post_shutdown.sh
Instance Backup - Arguments: -instance tbsbii -type cold -rfc 3-7OX901H
DB Special Instructions *2 - Arguments: -instance tbsbii -si_script db_pre_startup.sh
Database tier Startup - Arguments: -instance tbsbii -tier db -start
DB Special Instructions *3 - Arguments: -instance tbsbii -si_script db_post_startup.sh
Database PSU - Execution - Arguments: tbsbii   DBPSU#0117
EBS Apps Patching - Execution - Arguments: -script mco_ood_automation.sh -product EBSO
    -instance tbsbii -applymode apply -metafile ebso_cpu,forms_psu,oas_psu
    -options nolca,reusedeploy -autoconfig include
Discoverer Patching -Execution - Arguments: -script mco_ood_automation.sh -instance tbsbii
    -applymode apply -metafile noop -options reusedeploy -product DISCO
MT Special Instructions *2 - Arguments: -instance tbsbii -si_script mt_pre_startup.sh
EBS Middle tier Startup - Arguments: -instance tbsbii -tier mt -start
MT Special Instructions *3 - Arguments: -instance tbsbii -si_script mt_post_startup.sh
DB Post Health Checks - Arguments: -instance tbsbii -tier db -post
EBS MT Post Health Checks - Arguments: -instance tbsbii -tier mt -post

RESOLUTION OF TICKETS IN A MULTI-TENANT ENVIRONMENT

BACKGROUND OF THE DISCLOSURE

Technical Field

The present disclosure relates to multi-tenant computing environments, and more specifically to resolution of tickets in a multi-tenant environment.

Related Art

A multi-tenant environment refers to a computing environment in which computing resources are designed to serve multiple customers, referred to as tenants. A computing resource serving a customer in a corresponding duration is generally operative to be of that customer/tenant. In general, each tenant is provided a set of computing resources configured according to the requirements of the corresponding tenant.

Cloud infrastructure is an example of one such environment, in which each tenant is provided a corresponding collection of virtual computing and storage nodes, referred to as a cloud. Other common examples of multi-tenant environments include environments providing Software-as-a-Service (SaaS) and Platform-as-a-Service (PaaS).

Tickets are often raised when issues are encountered in such multi-tenant environments. Tickets typically specify description of the issue encountered to facilitate resolution of the issue. Resolution often entails performance of one or more tasks designed to fix/correct the issue in the environment where the issue has been encountered.

Aspects of present disclosure are directed to resolution of tickets in a multi-tenant environment.

BRIEF DESCRIPTION OF THE DRAWINGS

Example embodiments of the present disclosure will be described with reference to the accompanying drawings briefly described below.

FIG. 4A depicts portions of a historical data in one embodiment.

FIG. 4B depicts the relation between keywords extracted from the description of tickets and resolution jobs in one embodiment.

FIG. 4C depicts the manner in which historical tickets are mapped to gross jobs in one embodiment.

FIG. 5A depicts a portion of support tickets in one embodiment.

FIG. 5B depicts sample patterns used for determining gross job arguments in one embodiment.

FIG. 5C depicts the gross jobs and corresponding gross job arguments determined for pending tickets in one embodiment.

FIG. 6A depicts values of system parameters (and also gross job parameters) identified in a specific cloud in one embodiment.

FIG. 6B depicts a portion of a rules data in one embodiment.

FIGS. 6C and 6D respectively depicts the target jobs selected and the values of target job arguments determined for corresponding different clouds in one embodiment.

FIG. 6E depicts portions of availability list maintained for different clouds in one embodiment.

FIG. 7 depicts a portion of a payload sent for execution of a target job in a specific cloud in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
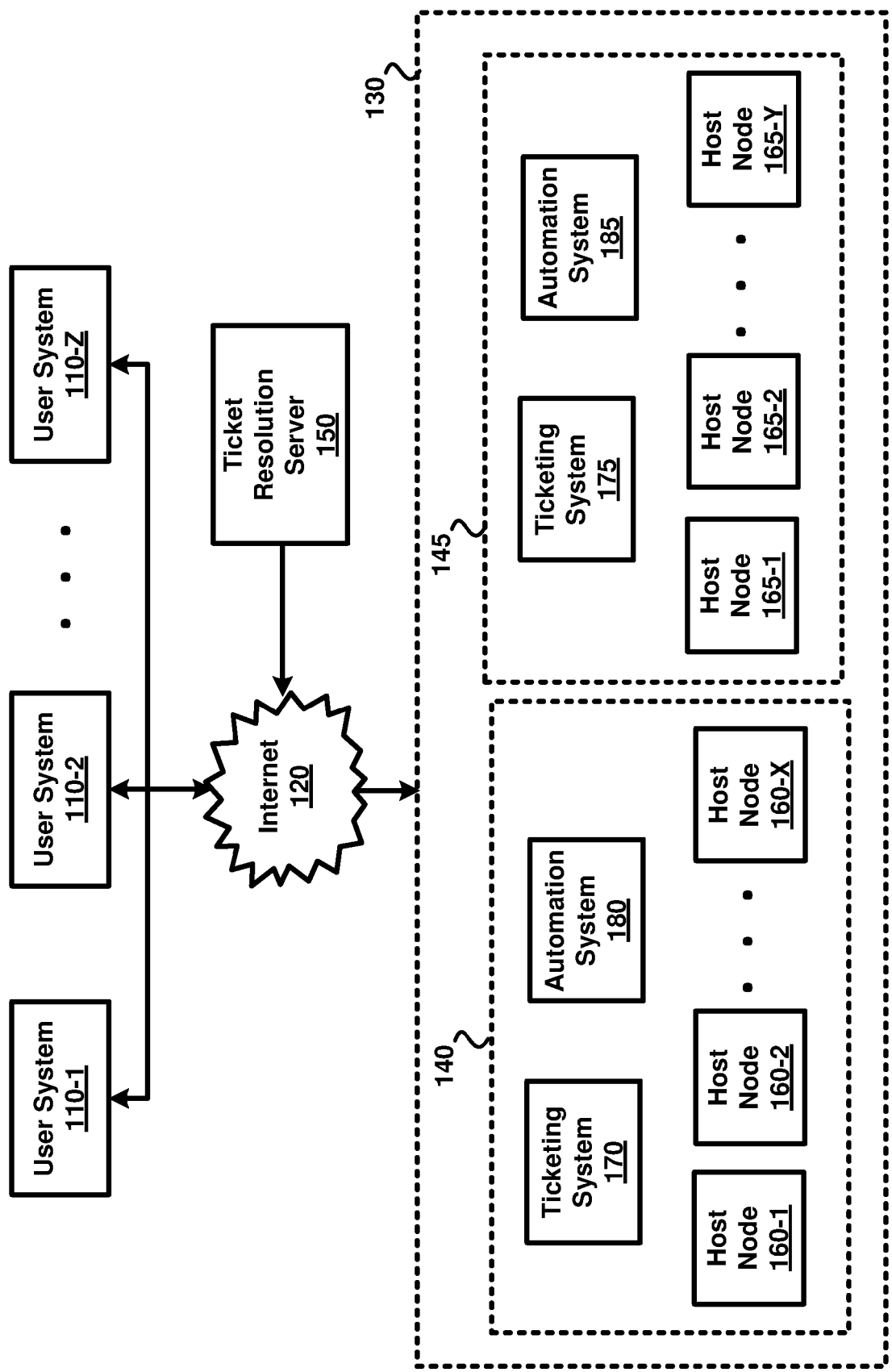
FIG. 1 is a block diagram illustrating an example environment (computing system) in which several aspects of the present invention can be implemented.

An aspect of the present disclosure facilitates resolving tickets in a multi-tenant environment. In one embodiment, a server receives a ticket for a tenant from a ticketing system and then determines a gross job representing a class of jobs suitable for resolution of the received ticket. The server then identifies a set of values for a set of system parameters characterizing computing resources serving the tenant. The server selects a target job based on the combination of the determined gross job and the set of values for the set of system parameters. The selected target job is then executed to cause resolution of the ticket for the tenant.

In one embodiment, the multi-tenant environment is a cloud infrastructure, with the computing resources serving a tenant containing software applications hosted as a cloud on the cloud infrastructure. The set of system parameters indicates the presence or absence of a corresponding software application in the cloud, with the executing of the target job affecting operation of at least one software application in the cloud.

In another embodiment, the multi-tenant environment is a Software-as-a-Service (SaaS) infrastructure, with the computing resources serving a tenant containing components of a software. The set of system parameters indicates the presence or absence of a corresponding component, with the executing of the target job affecting operation of at least one component of the software.

According to another aspect, the server performs the above noted actions automatically without manual intervention, in response to adding of the ticket into the ticketing system. In one embodiment, the server receives another ticket for another tenant, and determines the same gross job for another ticket as well. Upon identifying another set of values characterizing computing resources serving another tenant, the server selects a different target job based on the combination of the same gross job and the another set of values. The different target job is executed to cause resolution of another ticket for another tenant. Thus, different target jobs are selected based on the specific computing resources serving different tenants.

According to another aspect of the present invention, a server receives tickets for corresponding tenants, the tickets including description of respective issues. The server extracts keywords from the description of the tickets and creates a machine learning model designed to predict gross jobs based on historical information of occurrence of keywords. Upon receiving a ticket from a tenant, the server provides the received ticket as input to the machine learning model to receive the gross job as output. In one embodiment, the machine learning model is a decision tree.

According to yet another aspect of the present disclosure, in the scenario that respective computing resources serving corresponding tenants execute different instances of the same enterprise application, a tenant is facilitated to benefit from experience of other tenants captured by the machine learning model in the resolution of a ticket.

According to one more aspect of the present disclosure, a server maintains for each gross job, a rules data that maps the respective combinations of values of a set of system parameters to a corresponding one of set of target jobs. Upon receiving a ticket for a tenant, determining a gross job for the ticket and identifying a set for values for system parameters for the tenant, the server selects a target job based on the rules data for the determined gross job and the identified set of values for the system parameters.

According to yet another aspect of the present system, an availability list specifying target jobs available for execution in each cloud is maintained. Accordingly, after selection of a target job, the server determines, based on the availability list, an available job corresponding to the selected target job as the target job (to be executed for the tenant).

According to an aspect of the present disclosure, a server receives a ticket for a tenant and in response determining a gross job for the ticket, identifies a set for values for system parameters in a cloud of the tenant and selects a target job which causes resolution of the ticket for the tenant. When the executing of the target job requires values for a set of target job arguments, the server first determines a set of gross job arguments associated with the determined gross job. The server then obtains the values for the determined set of gross job arguments for the specific tenant and extrapolates the values for the target job arguments from the obtained values for the gross job arguments.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. In the following description, the features of the present disclosure are described with respect to the example multi-tenant environment of a cloud infrastructure. However, the features of the present disclosure may be implemented in alternative multi-tenant environments such as Software-as-a-Service (SaaS) and Platform-as-a-Service (PaaS), as will be apparent to one skilled in the relevant arts by reading the disclosure herein.

The block diagram is shown containing user systems 110-1 through 110-Z (Z representing any integer), Internet 120, ticket resolution server (TRS) 150, and cloud infrastructure 130. Cloud infrastructure 130 in turn is shown containing clouds 140 and 145. Cloud 140 is shown containing host nodes 160-1 through 160-X (X representing any integer), ticketing system 170 and automation system 180, while cloud 145 is shown containing host nodes 165-1 through 165-Y (Y representing any integer), ticketing system 175 and automation system 185. The user systems and host nodes in clouds 140/145 are collectively referred to by 110, 160 and 165 respectively.

Merely for illustration, only representative number/type of systems are shown in FIG. 1. Many environments often contain many more systems, both in number and type, depending on the purpose for which the environment is designed. Each block of FIG. 1 is described below in further detail.

Cloud infrastructure 130 represents a collection of physical nodes (160/165), connectivity infrastructure, data storages, other systems (such as 170/175 and 180/185), etc., which are engineered to together provide a virtual computing infrastructure for various customers/tenants, with the scale of such computing infrastructure being specified often on demand.

Each of clouds 140 and 145 represents a respective set of virtual computing and storage nodes provided to a corresponding tenant/customer based on the common cloud infrastructure 130. As such, cloud infrastructure 130 hosting clouds (140/145) of multiple tenants represent a multi-tenant cloud environment. In the following description, it is assumed that clouds 140 and 145 are provided to tenants T1 and T2 respectively.

All the systems (e.g. 160/165, 170/175 and 180/185) of cloud infrastructure 130 are assumed to be connected via an intranet. Internet 120 extends the connectivity of these (and other systems of cloud infrastructure) with external systems such as user systems 110 and TRS 150. Each of intranet and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and the intranet in cloud infrastructure 130. When the packet contains content such as port numbers, which specifies a target application, the packet may be said to be directed to such application as well.

Each of user-systems 110 represents a system such as a personal computer, workstation, mobile device, computing tablet etc., used by users to generate (user) requests directed to enterprise applications executing in cloud infrastructure 130. The user requests may be generated using appropriate user interfaces (e.g., web pages provided by an enterprise application executing in a node, a native user interface provided by a portion of an enterprise application downloaded from a node, etc.).

In general, a user system requests an enterprise application for performing desired tasks and receives the corresponding responses (e.g., web pages) containing the results of performance of the requested tasks. The web pages/ responses may then be presented to the user by user applications such as the browser. Each user request is sent in the form of an IP packet directed to the desired system or enterprise application, with the IP packet including data identifying the desired tasks in the payload portion.

Some of host nodes 160/165 may be implemented as corresponding data stores. Each data store represents a non-volatile (persistent) storage facilitating storage and retrieval of enterprise by applications executing in the other systems/nodes of cloud infrastructure 130. Each data store may be implemented as a corresponding database server using relational database technologies and accordingly provide storage and retrieval of data using structured queries such as SQL (Structured Query Language). Alternatively, each data store may be implemented as a corresponding file server providing storage and retrieval of data in the form of files organized as one or more directories, as is well known in the relevant arts.

Some of host nodes 160/165 may be implemented as corresponding server systems. Each server system represents a server, such as a web/application server, executing software/enterprise applications capable of performing tasks requested by users using user system 110. Each server system receives a client request from a user system and performs the tasks requested in the user request. A server system may use data stored internally (for example, in a non-volatile storage/hard disk within the server system), external data (e.g., maintained in a data store) and/or data received from external sources (e.g., from the user) in performing the requested tasks. The server system then sends the result of performance of the tasks to the requesting user system (one of 110) as a corresponding response to the user request. The results may be accompanied by specific user interfaces (e.g., web pages) for displaying the results to the requesting user.

It may be appreciated that each customer/tenant may host and execute different software applications in server systems of their respective clouds depending on their requirements. As such, a multi-tenant environment such as cloud infrastructure 130 typically contains clouds (e.g. 140/1450) hosting different sets of software applications. In other words, the computing resources (here, software/enterprise applications along with nodes/systems in the respective clouds) serving the different customers/tenants may be different.

In SaaS/PaaS environments, 130 may represent a data center containing systems executing multi-tenant capable software applications (such as Oracle WebLogic Server® available from Oracle Corporation®). Such a software application typically contains multiple components, with each customer/tenant being facilitated to choose the specific set of components to be made available for the tenant. In such a scenario, the set of components of the software application chosen by/made available to the tenant represents the computing resources serving the tenant.

It may be further appreciated that users may encounter issues during the performance of the user-requested tasks. Often (electronic or digital) tickets are raised for such issues specifically to facilitate tracking and resolution of the issues. As is well known, each ticket typically includes a description of the issue, date/time of encountering the issues, details of the hardware/software environment in which the issue was encountered, etc.

Each of ticketing systems 170/175 may facilitate creation/raising of tickets by users by providing appropriate user interfaces. Alternatively the ticketing systems may provide APIs using which tickets can be raised by external systems/enterprise applications. Each ticketing system thereafter tracks the status of the issues to aid resolution. Each ticketing system also ma maintain information such as the status of the issues, for example, outstanding/pending, resolution in progress and also the previous issues that have been resolved. Examples of such ticketing systems include but are not limited to Jira® Ticketing System available from Atlassian, Remedy Ticketing System available from BMC Software®, My Oracle Support™ Ticketing available from Oracle Corporation®, etc.

It may be readily appreciated that each of the ticketing systems 170/175 maintains a list of issues encountered in the nodes/systems of the corresponding clouds 140/145. While the ticketing systems are shown to be separate for different customers/clouds, in alternative embodiments such as SaaS/PaaS, a central ticketing system may be provided external to the customer clouds 140/145 which maintain the tickets raised by the different customers/tenants. In such a scenario, users in a customer support call center may handle reported customer issues by creating, updating, and resolving corresponding tickets in the central ticketing system. Example of such a central ticketing system is Freshdesk™ available from Freshworks® Incorporated.

As noted in the Background section, resolution of a ticket often entails performance of one or more tasks designed to fix the issue. Each of automation systems 180/185 represents a task execution framework that facilitates the management and execution of tasks in host nodes 160/165. Each automation system facilitates users to create a task, organize sets of tasks into jobs, schedule the execution of a task/job, execute a task/job at the scheduled time, provide a common run-time environment during execution of a task/job, capture and store the output of execution of a task/job, provide the output of a task/job to the users, etc. Example of such automation systems include but are not limited to the Marionette Collective Framework available from Puppet, open source software Salt Stack, etc.

In one prior approach, administrators of the clouds 140/145 are required to interact with ticketing systems 170/175 to identify a pending ticket, determine a corresponding resolution for a pending ticket, determine the tasks/jobs to implement the determined resolution, interact with automation systems 180/185 to execute the determined tasks/jobs immediately or at a scheduled time to cause the resolution of the pending ticket. Such an approach is time consuming and laborious.

Ticket resolution server (TRS) 150 provided according to several aspects of the present disclosure, facilitates efficient resolution of tickets in a multi-tenant environment (130). Though TRS 150 is shown external to 130, in one embodiment, TRS 150 is implemented in one of the nodes/systems of 130 to ward off security concerns in production deployments. Specifically, the implementation of TRS within a cloud infrastructure (130) avoids transmission (which are vulnerable to attacks) of customer/tenant data across the public Internet 120.

The manner in which TRS 150 facilitates resolution of tickets in a multi-tenant environment (130) is described below with examples.

3. Resolution of Tickets in a Multi-Tenant Environment

Figure 2:
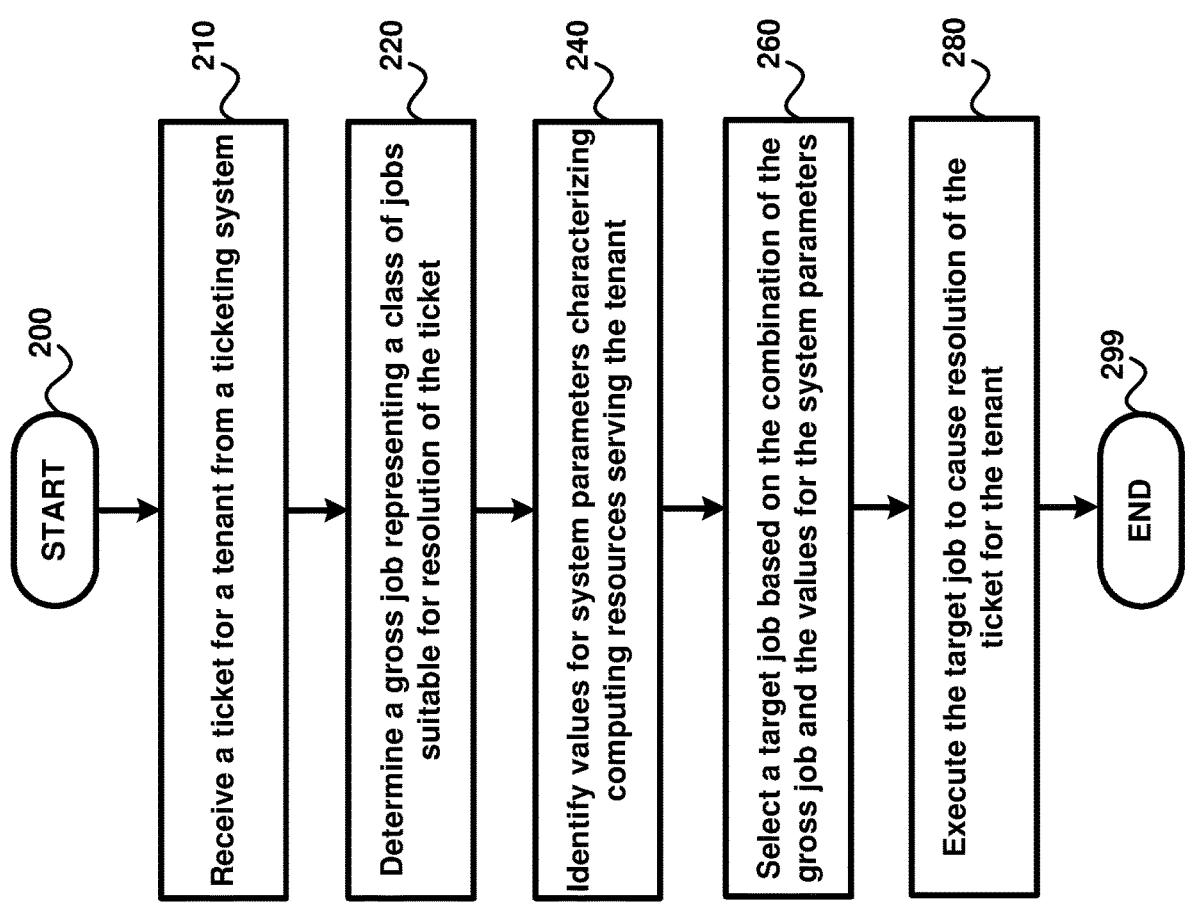
FIG. 2 is a flow chart illustrating the manner in which resolution of tickets in a multi-tenant environment is performed according to an aspect of the present disclosure.

FIG. 2 is a flow chart illustrating the manner in which resolution of tickets in a multi-tenant environment is performed according to an aspect of the present disclosure. The flowchart is described with respect to the systems of FIG. 1, in particular TRS 150, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, TRS 150 receives a ticket for a tenant (e.g. T1) from a ticketing system. The ticket may be received from one of ticketing systems 170 or 175. Alternatively, the ticket may be received from a central ticketing system (not shown in FIG. 1) maintaining the tickets from different tenants. As noted above, the received ticket contains detail of the issue encountered by the tenant.

In step 220, TRS 150 determines a gross job for the ticket that represents a class of jobs suitable for resolving the ticket. According to an aspect of the present disclosure, TRS 150 extracts keywords from the description of tickets and creates a machine learning model (e.g. decision tree) designed to predict gross jobs (defined by corresponding traits) based on historical information of occurrence of keywords. Upon receiving the ticket in step 210, TRS 150 provides the ticket as input to the machine learning model to receive a gross job as output.

In step 240, TRS 150 identifies values for (a set of) system parameters characterizing the computing resources serving the tenant. In a multi-tenant environment such as cloud infrastructure, the system parameters may characterize the software resources such as enterprise applications, operating systems, etc. or hardware resources such as processors, memory, etc. in a cloud (140/145) of the tenant. In a multi-tenant environment such as SaaS/PaaS, the system parameters may characterize the components/configuration of the multi-tenant capable software application.

In one embodiment, the identified values indicate whether or not the resources/components are present for the tenant. Thus, an identified set of values may be deemed as reflecting the environment of the tenant in which the resolution is to be implemented.

In step 260, TRS 150 selects a target job based on the combination of the gross job and the values for the system parameters. In other words, the gross job representing a class of jobs is converted to a specific target job based on the specific hardware/software environment serving the tenant.

In one embodiment, TRS 150 maintains rules data for each gross job that maps the respective combinations of values of the system parameters to a corresponding one of a set of target jobs. TRS 150 then selects the specific target job based on the rules data for the determined gross job and the identified values for the system parameters.

In step 280, TRS 150 executes the target job to cause resolution of the ticket for the tenant. In one embodiment, TRS 150 sends the details of the selected target job and a scheduled time to automation system 180/185, which in turn executes the selected target job at the scheduled time to cause resolution of the ticket. The flowchart ends in step 299.

It should be appreciated that TRS 150 performs the resolution of a ticket in two stages—first determining a gross job for a ticket for a tenant based on a machine learning model; and then mapping the gross job to a specific target job based on the computing resources serving the tenant. Such a two-stage process facilitates the ticket to be resolved automatically without any manual intervention in a diverse multi-tenant environment, in response to adding of the ticket into the ticketing system.

It may be further appreciated that when the computing resources (e.g. clouds 140/145) serving corresponding tenants execute different instances of the same enterprise application, for resolving a ticket, a tenant (e.g. T1) is facilitated to benefit from experience of other tenants (e.g. T2) captured by the machine learning model.

The manner in which TRS 150 performs the resolution of tickets in a multi-tenant environment (130) according to the steps of FIG. 2 is described below with examples.

4. Example Implementation for Cloud Infrastructure

Figure 3:
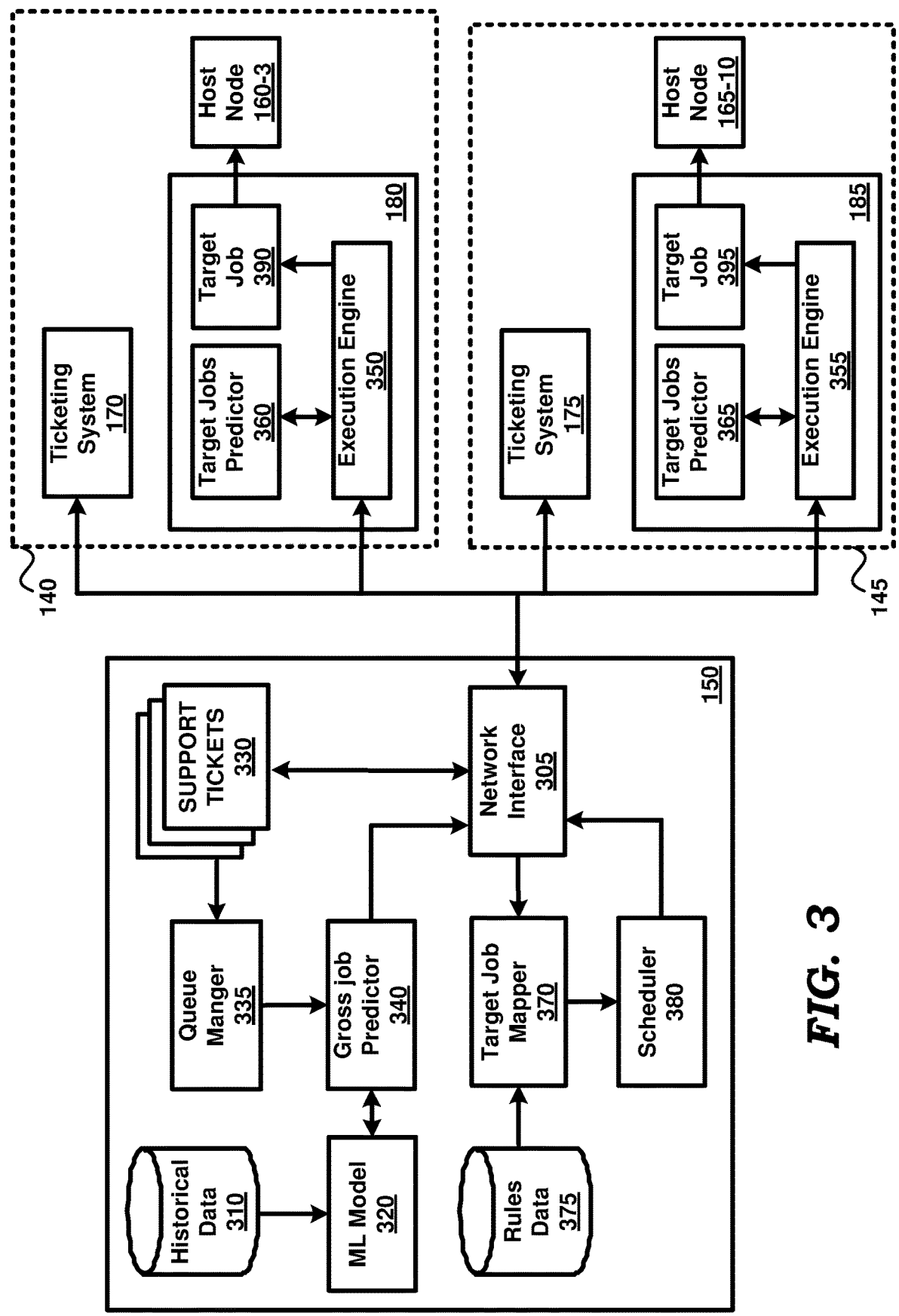
FIG. 3 depicts an example implementation for resolution of tickets in a multi-tenant cloud environment.

FIG. 3 depicts an example implementation for resolution of tickets in a multi-tenant cloud environment. Ticket resolution server (TRS) 150 is shown containing network interface 305, historical data 310, machine learning (ML) model 320, support tickets 330, queue manager 335, gross job predictor 340, target job mapper 370, rules data 375 and scheduler 380. Automation system 180 is shown containing execution engine 350, target jobs predictor 360, and target job 390, while automation system 185 is shown containing execution engine 355, target jobs predictor 365 and target job 395. Each of the blocks is described in detail below.

Network interface 305 facilitates components of TRS 150 such as support tickets 330, gross job predictor 340, etc. to communicate (send and receive) with external systems in cloud infrastructure 130 via Internet 120.

Historical data 310 indicates the various tickets which have been received/resolved and the corresponding target jobs identified/used for the resolution (hereafter "resolution jobs"). Historical data 310 includes tickets received from multiple tenants and the corresponding resolution jobs. The tickets may describe issues encountered with multiple different enterprise applications executing in the respective clouds of different tenants. In one embodiment, historical data 310 is used as training data for generating ML model 320.

FIG. 4A depicts portions of a historical data in one embodiment. Though the data portion of FIG. 4A (and also FIGS. 4C, 5A, and 6B) is shown in the form of a table, the data portion may be maintained according to other data formats (such as extensible markup language (XML), etc.) and/or using other data structures (such as lists, trees, etc.), as will be apparent to one skilled in the relevant arts by reading the disclosure herein.

Table 400 indicates the association between the tickets (shown in columns with headings "RFC", "Title" and "Description") and the corresponding resolution jobs (shown in column "Atom Job"). Column "SID" indicates the specific system/node on which the resolution job is to be executed. It should be noted that the historical data used in the generated of the ML model is primarily from the "Title" and "Description" columns.

Referring again to FIG. 3, Machine learning (ML) model 320 represents a current model generated based on historical data 310 using a machine learning algorithm. Broadly, TRS 150 generates the model based on the historical occurrence of features in the description of the tickets in historical data 310.

In one embodiment, TRS 150 first extracts important keywords (representing features) from the details (such as "Title" and "Description" columns of table 400) of the tickets. FIG. 4B depicts the relation between keywords extracted from the details of tickets and resolution jobs in one embodiment. Specifically, data portion 440 specifies top 10 keywords identified for each resolution job in historical data 310. For example, for the job "1099 Patching", the top ten keywords include "patch", "pmp", "latest", etc. According to an aspect of the present disclosure, target/resolution jobs having the same/similar top 10 keywords (as shown in FIG. 4B) are all grouped into a single gross job. The manner in which such grouping may be performed in described in detail below.

Referring again to FIG. 3, TRS 150 first checks if the extracted keywords are good predictors of any of the resolution jobs through a co-variance plot. If the co-variance plot shows random blots or noisy process, TRS 150 tries to group the resolution jobs in a cluster called gross jobs and performs extracting and checking of the keywords against the clusters. It may be appreciated the grouping of resolution jobs into the cluster may be based on common characteristics, and as such a gross job represents a class of jobs potentially suitable for resolving the ticket (resolution jobs).

FIG. 4C depicts the manner in which historical tickets are mapped to gross jobs in one embodiment. In particular, table 460 indicates the mapping between historical tickets (column "RFC") and corresponding gross job (column "Gross job"). It may be readily observed that tickets in multiple rows are mapped to the same gross job "DB PSU" representing the class of Database ("DB") Patch Set Updates ("PSU").

Referring again to FIG. 3, TRS 150 performs the above noted process of extracting, checking and grouping iteratively until the predictors have a good positive correlation with gross jobs/clusters. TRS 150 then builds a Random Forest (a collection of decision trees) based classifier (decision tree) as ML model 320 capable of predicting (output) a gross job for a new ticket (sent as input).

Figure 4D:
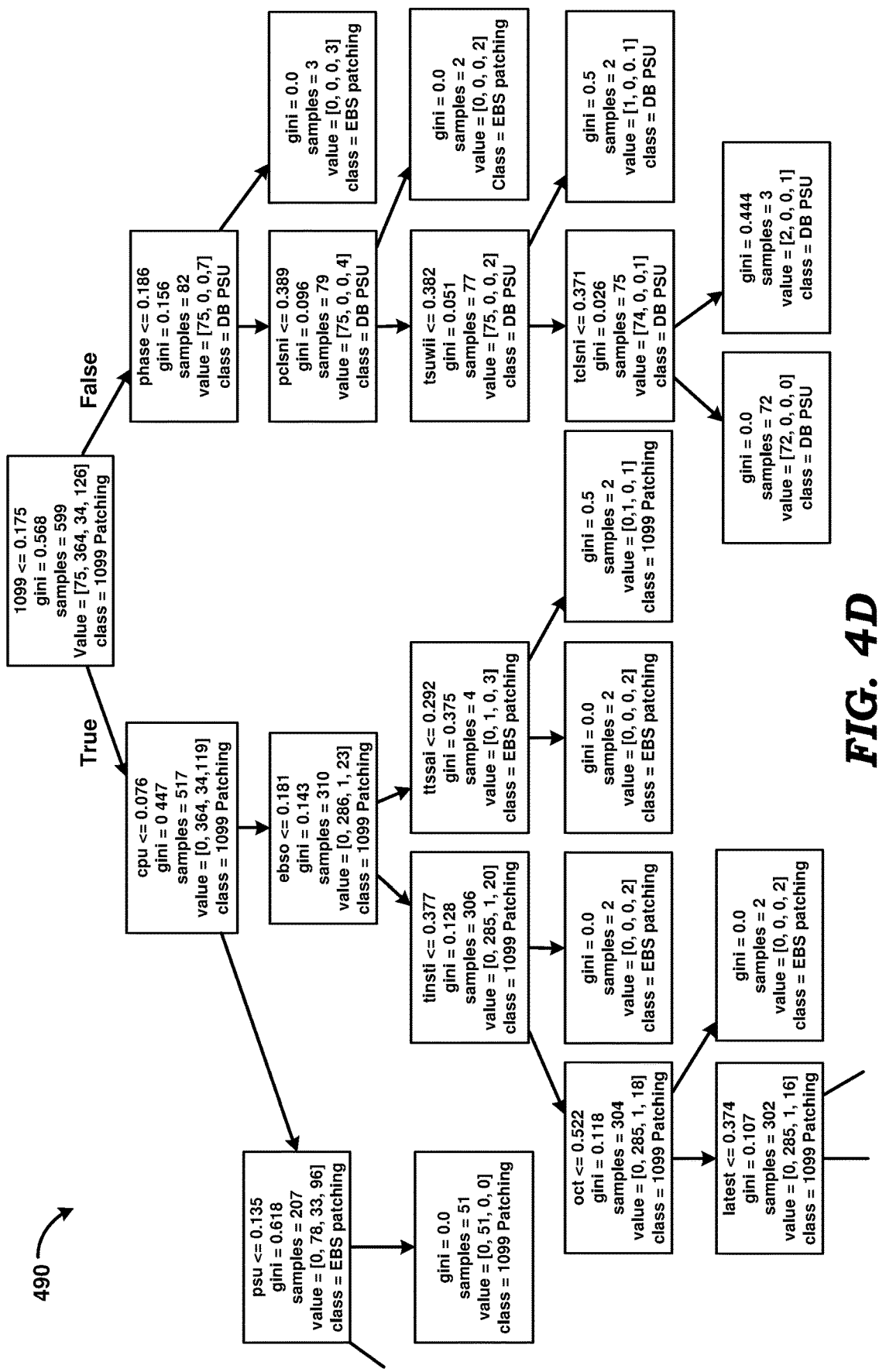
FIG. 4D depicts a portion of a decision tree generated for predicting gross jobs in one embodiment.

FIG. 4D depicts a portion of a decision tree generated for predicting gross jobs in one embodiment. In particular, decision tree 490 depicts some of the nodes of the decision tree, with each node indicating conditions associated with one or more keywords (inputs). Each node in decision tree 490 is also associated with a class/gross job (possible output).

It may be appreciated that as historical data 310 includes tickets from multiple tenant, ML model 320 captures the experience of different tenants in the resolution of a ticket, especially when the tickets are for different instances of the same enterprise application executing on respective clouds of corresponding tenants.

Thus, a ML model representing the historical information about the tickets and corresponding resolution jobs is generated by TRS 150. The manner in which ML model 320 is used for prediction of gross jobs in the processing of pending/outstanding tickets is described below with examples.

5. Predicting Gross Jobs

Support tickets 330 represent the currently pending tickets that have been received for different tenants such as T1 and T2. Support tickets 330 are received from ticketing systems 170 and 175. The tickets may be received periodically or upon a ticket being added to the ticketing system. Support tickets 330 contain the ticket information available in ticketing systems 170/175 and also additional information such as the specific tenant who has raised the ticket, any tenant preferences on when the ticket is to be resolved, etc.

FIG. 5A depicts a portion of support tickets in one embodiment. In particular, table 500 indicates the ticket information such as a unique identifier associated with the ticket (columns "SR_RFC", and "ID"), the system/cloud on which the ticket was raised (columns "TARGET" and "TARGET_TYPE"), and also additional information such as name of the customer/tenant (column "CUSTOMER_NAME").

Referring again to FIG. 3, queue manager 335 classifies the received support tickets 330 into one or more categories, referred to as queues. The categories may correspond to different enterprise applications, different tenants, severity of the tickets, etc. Such categorization facilitates queue manager 335 to provide optimization features based on workload of teams associated with types of tickets, analytics purposes and options to enable custom rules during picking of the support ticket. Queue manager 335 then picks a pending ticket (that is to be resolved) from support tickets 330 and provides it to gross job predictor 340. In the following description, it is assumed that the picked pending ticket is for tenant T1 and is received from ticketing system 170.

Gross job predictor 340 receives the pending ticket from queue manager 335, provides it as input to ML model 320 and receives a gross job as output of ML model 320. In one embodiment, gross job predictor 340 extracts keywords from the description of the pending ticket to identify important information from the ticket and then forwards the extracted keywords to Random Forest (decision trees) based classifier which predicts a gross job based on historic information of the occurrence of the extracted keywords.

Specifically, decision tree 490 is traversed based on the probability of occurrence of the extracted keywords, the probability being calculated based on the historical information. Starting at the root node, the probability associated with one of the keywords is used as the basis of choosing the specific child node to traverse. The traversal to child nodes is performed repeatedly based on all the keywords to arrive at an intermediate node or until a leaf node is reached. The class/gross job associated with the intermediate node/lead node is deemed as a possible output of ML model.

It may be appreciated that for a same set of keywords, multiple traversals of decision tree 490 may be performed based on difference sequences in which the keywords can be selected for choice of child nodes, and accordingly determine a set of possible outputs. A confidence value for each output is computed based on the traversal, and possible output with the maximum confidence value is then selected as the output of ML model 320.

Gross job predictor 340 also determines a set of gross job arguments/parameters associated with the predicted gross job. The set of gross job arguments are used as the basis for extrapolating values for the target job arguments requires for execution of the selected target job. In one embodiment, the set of gross job parameters are determined based on predefined patterns.

FIG. 5B depicts sample patterns used for determining gross job arguments in one embodiment. The patterns shown in data portion 550 may be applied to the predicted gross job and the keywords extracted from the pending ticket to determine the set of gross job arguments for the predicted gross job.

FIG. 5C depicts the gross jobs and corresponding gross job arguments determined for pending tickets in one embodiment. The gross jobs are determined based on decision tree 490, while the gross job arguments are determined based on the patterns in data portion 550. In particular, data portion 580 indicates for each pending ticket (indicated by the lines starting with "RFC:"), a corresponding gross job predicted ("Gross job:"), the corresponding gross job arguments ("Arguments:") and a confidence value associated with prediction/determination ("Prediction Confidence:").

It may be readily observed that for one of the tickets (3-86BH62U) the predicted gross jobs is "PSU" indicating that the actual job used for resolving this ticket will belong to the class of Patch Set Updates ("PSU"). However, it may be appreciated such a patch set update is dependent on the details of the specific cloud where the ticket was raised. In particular, it is desirable to know the current version of the PSU already applied in the specific cloud, so as to facilitate the next version of the PSU to be applied in the specific cloud (thereby resolving the ticket). As such, the predicted set of gross job arguments for the gross job "PSU" includes "PSU": {latest} indicating that the latest/current version of PSU applied in the specific cloud be identified.

Referring again to FIG. 3, gross job predictor 340 sends (via network interface 305) the predicted gross job and set of gross job arguments in the form of a gross job request to the specific execution engine (350/355) executing in the specific cloud where the issue was encountered. For the pending ticket for tenant T1, gross job predictor 340 sends the gross job request to execution engine 350 executing in automation system 180 of cloud 140.

The manner in which such gross job requests are processed and specific target jobs are identified to execute in difference clouds (140/145) of a multi-tenant cloud architecture (130) is described below with examples.

6. Identifying and Executing Target Jobs

Each of execution engines 350/355 represents a task execution framework provided by the example automation systems noted above. Execution engines 350/355 facilitate the management and execution of tasks/jobs in host nodes of the corresponding cloud 140/145. Upon receiving the gross job request from gross job predictor 340, execution engine 350 invokes target jobs predictor 360 and passes the gross job request to target jobs predictor 360.

Target job predictor 360/365 represents a script that is executed in the context of automation system 180/185. Upon execution, target job predictor 360 first identifies values for a set of system parameters characterizing the components of cloud 140. The system parameters capture the system level details of the specific cloud (e.g. 140 for the pending ticket) where the issue was encountered, and accordingly facilitates the mapping of the predicted gross job to a target job suitable for execution in that specific cloud. The specific set of system parameters may be pre-configured or may be received as part of the gross job request.

Target jobs predictor 360 also receives the gross job request and finds the values in the specific cloud (140) for the set of gross job arguments specified in the gross job request. Target jobs predictor 360 then sends the identified values for the set of system parameters and the values found for the gross job arguments as a response to the gross job request received from TRS 150.

FIG. 6A depicts values of system parameters (and also gross job parameters) identified in a specific cloud (140) in one embodiment. In data portion 600, the "instanceInfo" line indicates the values identified for systems parameters "EBS'", "R122", "RAC", and "DR" with the value "1" indicating the presence of the corresponding components in cloud 140. The "grossArgs" line indicates the respective values {'2018', 'apr'}, {'2018', 'apr'} found for the gross job arguments "CPU" and "PSU".

Target job mapper 370 receives (via network interface 305) the response to gross job request from target jobs predictor 360 and selects one of the target jobs from the identified set of target jobs based on the identified values of the systems parameters and rules data 375. Rules data 375 specifies for each gross job, a mapping between the respective combinations of values of a set of system parameters to a corresponding one of a set of target jobs.

FIG. 6B depicts a portion of a rules data in one embodiment. Table mapping 630 specifies the mapping maintained for the gross job "PSU". Columns "EBS", "DB_Version", "R122", etc. through "Refresh" represents the system parameters, while column "Job Name" indicates the name of the mapped target job. In one embodiment, the values for the parameters indicate whether a corresponding component is present (value "1") or absent (value "0") in the specific cloud (e.g. 140).

Upon receiving the response containing the information shown in FIG. 6A, TRS 150 selects target job "RAC DB PSU EBS122 AppPatch—with DR" in view of data portion 600 indicating the presence of the components "EBS'", "R122", "RAC", and "DR". Target job mapper 370 also determines the values for the target job arguments required for execution of the selected target job. In one embodiment, TRS 150 extrapolates of the values for the target job arguments based on the values obtained for the gross job arguments.

FIGS. 6C and 6D respectively depicts the target jobs selected and the values of target job arguments determined for corresponding different clouds in one embodiment. In data portions 660 and 670, the Detected Job represents the target job selected based on the values of the system parameters, while Detected Dynamic Args represents the target job arguments.

According to an aspect of the present disclosure, TRS 150 also maintains an availability list that maps the target jobs (shown in rules data) to jobs available for execution in each cloud. In such a scenario, target job mapper 370 also determines an available job corresponding to the target job previously determined based on rules data, and makes the available job as the target job to be executed in the corresponding cloud.

FIG. 6E depicts portions of availability list maintained for different clouds in one embodiment. Data portions 680 and 690 depict portions of an availability list maintained for clouds 140 and 145 respectively. It may be observed that the target job "RAC DB PSU EBS122 AppPatch—with DR" has been mapped to an available job with the same name in the availability list/data portion 680 for cloud 140, while the same target job has been mapped to the available job "RAC DB Patch EBS122 AppPatch—with DR" in the availability list/data portion 690 for cloud 145. It should be further noted that in the scenario that the target job selected based on the rules data is not contained in the availability list for the cloud (as indicated by a blank value in the "Available Job" column), TRS 150 may notify an administrator of the corresponding cloud about the absence of the job required for the resolution of the received ticket.

Target job mapper 370 then forwards the selected/determined target job and the values for the target job arguments to scheduler 380. The description is continued assuming that the selected target job for the pending ticket is target job 390.

Scheduler 380 creates a payload for execution engine 350/355 by combining the selected target job (390), the target job arguments and a time slot for execution (for example, provided by the tenant as part of the pending support ticket). Scheduler 380 then submits the created payload to the specific execution engine 350 to schedule the selected target job (390) for execution. At the scheduled time slot, execution engine 350 causes execution of target job 390.

FIG. 7 depicts a portion of a response to a payload sent for execution of a target job in a specific cloud in one embodiment. The data portion "Run UUID" indicates that the payload sent was accurate and that the target job was scheduled and executed successfully with the job ID given by the correspond value "2018Feb000005226".

Referring again to FIG. 3, target job 390 is shown updating host node 160-3 as part of resolving of the pending ticket. Upon successful completion of execution of target job 390, the pending ticket may be updated to indicate successful resolution. The details of the pending ticket and target job 390 may be added to historical data 310 for generating a more accurate ML model 320. In one embodiment, a background process run periodically, updates ML model 320 based on the updated historical data 310. As such, the instant invention has in-built self calibration useful when the patterns in the incoming support tickets keep changing with time. In other words, ML model 320 is auto-calibrated with the latest trend (in the tickets).

Though described above with respect to cloud 140 of tenant T1, it may be appreciated that similar actions may be performed in response to a pending ticket for tenant T2 received from ticketing system 175. In such a scenario, the gross job request is sent to execution engine 355, with target jobs predictor 365 identifying the set of target jobs and finding the values in cloud 145 for the gross job parameters. Furthermore, the selected target job for resolving the pending ticket is target job 395 (which may be same or different from target job 390), which upon execution is shown updating host node 165-10 in cloud 145 for resolving the pending ticket.

It should be further appreciated that the features described above can be implemented in various embodiments as a desired combination of one or more of hardware, software, and firmware. The description is continued with respect to an embodiment in which various features are operative when the software instructions described above are executed.

7. Digital Processing System

Figure 8:
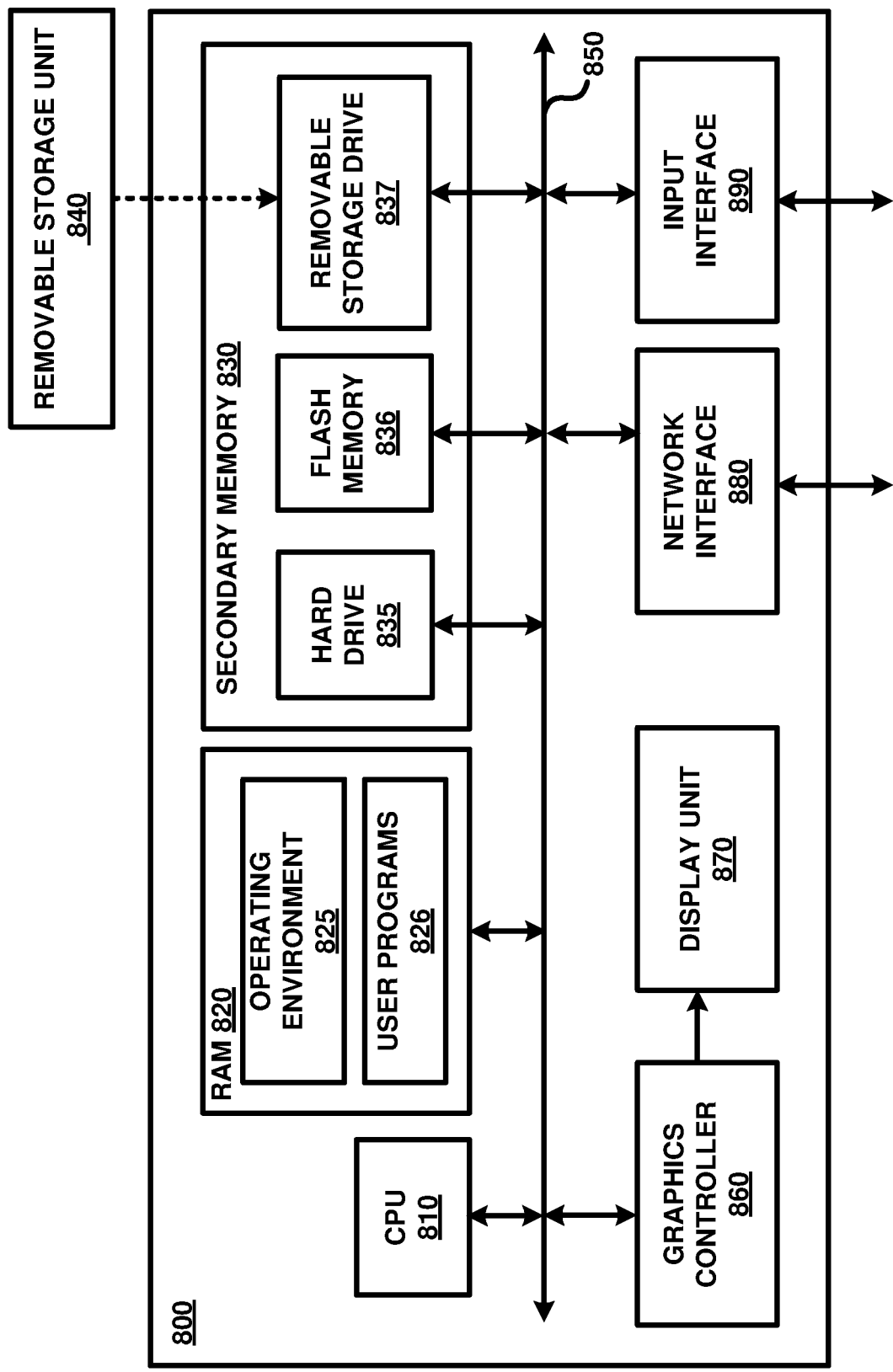
FIG. 8 is a block diagram illustrating the details of a digital processing system in which various aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to ticket resolution server (TRS) 150 or one of nodes/systems of cloud infrastructure 130.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or other user programs 826 (such as other applications, DBMS, etc.). In addition to shared environment 825, RAM 820 may contain other software programs such as device drivers, virtual machines, etc., which provide a (common) run time environment for execution of other/user programs.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems (of FIG. 1) connected to the networks (120).

Secondary memory 830 may contain hard drive 835, flash memory 836, and removable storage drive 837. Secondary memory 830 may store the data (for example, data portions shown in FIGS. 4A-4D, 5A-5C, 6A-6D and 7) and software instructions (for example, for implementing the various features of the present disclosure as shown in FIG. 3, etc.), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

8. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A digital processing system comprising:
    a random access memory (RAM) to store instructions; and
    one or more processors to retrieve and execute said instructions, wherein execution of said instructions causes said digital processing system to perform the actions of:
        creating a machine learning model designed to predict gross jobs based on historical information in tickets and gross jobs executed for resolution of said tickets, wherein said machine learning model is a decision tree comprising a plurality of nodes, each node being associated with a corresponding keyword, and wherein each of node of only some of said plurality of nodes are associated with a corresponding gross job;
        receiving a ticket containing description of issues for a first tenant from a ticketing system, wherein said description contains keywords;
        determining a gross job of a plurality of gross jobs based on said keywords of said description, said gross job representing a class of jobs, wherein each job of said class of jobs is suitable for resolution of said ticket in a corresponding tenant configured to be served by a respective combination of computing resources, wherein said determining comprises:
            traversing said decision tree based on the probability of occurrence of said keywords to identify a set of nodes of said plurality of nodes, wherein each node of said set of nodes is associated with a corresponding gross job;
            computing, associated with said traversing, a respective confidence value for each node of said set of nodes, the confidence value reflecting a degree of certainty of said corresponding gross job to address the issues in said ticket given the extracted keywords of said description; and
            selecting, based on said respective confidence values, a first node of said set of nodes, wherein the corresponding gross job associated with said first node is determined as said gross job;
        identifying data specifying a first combination of computing resources currently configured to serve said first tenant;
        selecting a first target job from said class of jobs represented by said gross job, based on both of said gross job and said first combination of computing resources currently configured to serve said tenant; and
        executing said first target job to cause resolution of said ticket for said first tenant,
        wherein said determining is performed without using said data specifying computing resources currently configured to serve said first tenant, and wherein said selecting is performed after said determining.

2. The digital processing system of claim 1, wherein a specification includes data indicating a corresponding combination of computing resources configured to serve a respective tenant,
    wherein said identifying comprises examining said specification to identify said first combination for said first tenant,
    wherein said receiving, said determining, said identifying, said selecting and said executing are all performed automatically without manual intervention, in response to adding of said ticket into said ticketing system.

3. The digital processing system of claim 1, further performing the actions of:
    receiving said tickets for corresponding tenants, said tickets including description of respective issues; and
    extracting keywords from said description of said tickets, wherein said creating creates said machine learning model based on occurrence of keywords in said tickets.

4. The digital processing system of claim 1, further performing the actions of maintaining for each gross job of said plurality of gross jobs, a respective rules data that maps the respective combinations of values of said set of system parameters to a corresponding one of a plurality of target jobs,
    wherein said selecting selects said first target job based on said rules data for said gross job and said first set of values for said set of system parameters specified in said specification.

5. A non-transitory machine readable medium storing one or more sequences of instructions, wherein execution of said one or more instructions by one or more processors contained in a server causes said server to perform the actions of:
    creating a machine learning model designed to predict gross jobs based on historical information in tickets and gross jobs executed for resolution of said tickets, wherein said machine learning model is a decision tree comprising a plurality of nodes, each node being associated with a corresponding keyword, and wherein each of node of only some of said plurality of nodes are associated with a corresponding gross job;

receiving a ticket containing description of issues for a first tenant from a ticketing system, wherein said description contains keywords;

determining a gross job of a plurality of gross jobs based on said keywords of said description, said gross job representing a class of jobs, wherein each job of said class of jobs is suitable for resolution of said ticket in a corresponding tenant configured to be served by a respective combination of computing resources, wherein said determining comprises:

traversing said decision tree based on the probability of occurrence of said keywords to identify a set of nodes of said plurality of nodes, wherein each node of said set of nodes is associated with a corresponding gross job;

computing, associated with said traversing, a respective confidence value for each node of said set of nodes, the confidence value reflecting a degree of certainty of said corresponding gross job to address the issues in said ticket given the extracted keywords of said description; and selecting, based on said respective confidence values, a first node of said set of nodes, wherein the corresponding gross job associated with said first node is determined as said gross job;

identifying data specifying a first combination of computing resources currently configured to serve said first tenant;

selecting a first target job from said class of jobs represented by said gross job, based on both of said gross job and said first combination of computing resources currently configured to serve said tenant; and executing said first target job to cause resolution of said ticket for said first tenant, wherein said determining is performed without using said data specifying computing resources currently configured to serve said first tenant, and wherein said selecting is performed after said determining.

6. The non-transitory machine readable medium of claim 5, wherein a specification includes data indicating a corresponding combination of computing resources configured to serve a respective tenant, wherein said identifying comprises examining said specification to identify said first combination for said first tenant, wherein said receiving, said determining, said identifying, said selecting and said executing are all performed automatically without manual intervention, in response to adding of said ticket into said ticketing system.

7. The non-transitory machine readable medium of claim 6, wherein said multi-tenant environment is a cloud infrastructure, wherein said computing resources configured to serve said first tenant comprises software applications hosted as a first cloud on said cloud infrastructure, wherein said specification specifies a first set of values for a set of system parameters indicating the presence or absence of a corresponding software application configured to serve said first tenant in said first cloud, wherein said executing of said first target job affects operation of at least one software application in said first cloud.

8. The non-transitory machine readable medium of claim 7, further performing the actions of maintaining for each gross job of said plurality of gross jobs, a respective rules data that maps the respective combinations of values of said set of system parameters to a corresponding one of a plurality of target jobs, wherein said selecting selects said first target job based on said rules data for said gross job and said first set of values for said set of system parameters specified in said specification.

9. The non-transitory machine readable medium of claim 8, further comprising maintaining an availability list specifying target jobs available for execution in said first cloud, said selecting further comprising determining, based on said availability list, a first available job corresponding to said first target job as said first target job.

10. The non-transitory machine readable medium of claim 9, wherein said executing of said first target job requires values for a first set of target job arguments, said actions further comprising:

determining a set of gross job arguments associated with said gross job;

obtaining a third set of values for said set of gross job arguments specific to the computing resources configured to serve said first tenant;

extrapolating a fourth set of values for said first set of target job arguments from said third set of values for said set of gross job arguments.

11. The non-transitory machine readable medium of claim 6, wherein said receiving receives a second ticket for a second tenant, wherein said determining determines said gross job for said second ticket, wherein said identifying identifies a second set of values for said set of system parameters characterizing computing resources configured to serve said second tenant, wherein said selecting selects a second target job based on the combination of said gross job and said second set of values for said set of system parameters, said second target job being different from said first target job, wherein said executing executes said second target job at a scheduled time to cause resolution of said second ticket for said second tenant, wherein said scheduled time is received along with said second ticket from said second tenant.

12. The non-transitory machine readable medium of claim 5, wherein said multi-tenant environment is a Software-as-a-Service (SaaS) infrastructure, wherein said computing resources configured to serve said first tenant comprises components of a software, wherein said set of system parameters indicates the presence or absence of a corresponding component, wherein said executing of said first target job affects operation of at least one component of said software.

13. The non-transitory machine readable medium of claim 5, further performing the actions of:

receiving said tickets for corresponding tenants, said tickets including description of respective issues; and extracting keywords from said description of said tickets, wherein said creating creates said machine learning model based on occurrence of keywords in said tickets.

14. The non-transitory machine readable medium of claim 13, wherein the computing resources configured to serve said corresponding tenants comprises different instances of the same enterprise application, whereby, in resolving said ticket, said first tenant is facilitated to benefit from experience of other tenants captured by said machine learning model.

15. A method for resolving tickets in a multi-tenant environment, said method comprising:

creating a machine learning model designed to predict gross jobs based on historical information in tickets and gross jobs executed for resolution of said tickets, wherein said machine learning model is a decision tree comprising a plurality of nodes, each node being associated with a corresponding keyword, and wherein each of node of only some of said plurality of nodes are associated with a corresponding gross job;

receiving a ticket containing description of issues for a first tenant from a ticketing system, wherein said description contains keywords; determining a gross job of a plurality of gross jobs based on said keywords of said description, said gross job representing a class of jobs, wherein each job of said class of jobs is suitable for resolution of said ticket in a corresponding tenant configured to be served by a respective combination of computing resources, wherein said determining comprises:

traversing said decision tree based on the probability of occurrence of said keywords to identify a set of nodes of said plurality of nodes, wherein each node of said set of nodes is associated with a corresponding gross job;

computing, associated with said traversing, a respective confidence value for each node of said set of nodes, the confidence value reflecting a degree of certainty of said corresponding gross job to address the issues in said ticket given the extracted keywords of said description; and selecting, based on said respective confidence values, a first node of said set of nodes, wherein the corresponding gross job associated with said first node is determined as said gross job;

identifying data specifying a first combination of computing resources currently configured to serve said first tenant;

selecting a first target job from said class of jobs represented by said gross job, based on both of said gross job and said first combination of computing resources currently configured to serve said tenant; and executing said first target job to cause resolution of said ticket for said first tenant, wherein said determining is performed without using said data specifying computing resources currently configured to serve said first tenant, and wherein said selecting is performed after said determining.

16. The method of claim 15, wherein a specification includes data indicating a corresponding combination of computing resources configured to serve a respective tenant, wherein said identifying comprises examining said specification to identify said first combination for said first tenant, wherein said receiving, said determining, said identifying, said selecting and said executing are all performed automatically without manual intervention, in response to adding of said ticket into said ticketing system.

17. The method of claim 16, wherein said multi-tenant environment is a cloud infrastructure, wherein said computing resources configured to serve said first tenant comprises software applications hosted as a first cloud on said cloud infrastructure, wherein said specification specifies a first set of values for a set of system parameters indicating the presence or absence of a corresponding software application configured to serve said first tenant in said first cloud, wherein said executing of said first target job affects operation of at least one software application in said first cloud.

18. The method of claim 17, further performing the actions of maintaining for each gross job of said plurality of gross jobs, a respective rules data that maps the respective combinations of values of said set of system parameters to a corresponding one of a plurality of target jobs, wherein said selecting selects said first target job based on said rules data for said gross job and said first set of values for said set of system parameters specified in said specification.

19. The method of claim 18, further comprising maintaining an availability list specifying target jobs available for execution in said first cloud, said selecting further comprising determining, based on said availability list, a first available job corresponding to said first target job as said first target job.

20. The method of claim 16, wherein said receiving receives a second ticket for a second tenant, wherein said determining determines said gross job for said second ticket, wherein said identifying identifies a second set of values for said set of system parameters characterizing computing resources configured to serve said second tenant, wherein said selecting selects a second target job based on the combination of said gross job and said second set of values for said set of system parameters, said second target job being different from said first target job, wherein said executing executes said second target job at a scheduled time to cause resolution of said second ticket for said second tenant, wherein said scheduled time is received along with said second ticket from said second tenant.

* * * * *